US012210626B2

(12) United States Patent
Karlsson et al.

(10) Patent No.: US 12,210,626 B2
(45) Date of Patent: Jan. 28, 2025

(54) METHOD FOR PRIORITIZING AMONG VULNERABILITIES IN A SOFTWARE CODE AND A SERVER

(71) Applicant: debricked AB, Malmö (SE)

(72) Inventors: Linus Karlsson, Lund (SE); Pegah Nikbakht Bideh, Lund (SE); Martin Hell, Malmö (SE)

(73) Assignee: debricked AB (SE)

( * ) Notice: Subject to any disclaimer, the term of this patent is extended or adjusted under 35 U.S.C. 154(b) by 525 days.

(21) Appl. No.: 17/594,225

(22) PCT Filed: Apr. 7, 2020

(86) PCT No.: PCT/EP2020/059881
§ 371 (c)(1),
(2) Date: Oct. 7, 2021

(87) PCT Pub. No.: WO2020/208010
PCT Pub. Date: Oct. 15, 2020

(65) Prior Publication Data
US 2022/0179967 A1   Jun. 9, 2022

(30) Foreign Application Priority Data
Apr. 12, 2019   (SE) .................... 1950462-0

(51) Int. Cl.
*G06F 21/57* (2013.01)
*G06Q 10/0635* (2023.01)

(52) U.S. Cl.
CPC ....... *G06F 21/577* (2013.01); *G06Q 10/0635* (2013.01); *G06F 2221/033* (2013.01)

(58) Field of Classification Search
CPC ............ G06F 21/577; G06F 2221/033; G06Q 10/0635

(Continued)

(56) References Cited

U.S. PATENT DOCUMENTS

2007/0067846 A1   3/2007  McFarlane et al.
2012/0011493 A1   1/2012  Singh et al.
(Continued)

FOREIGN PATENT DOCUMENTS

WO   02/096013 A1   11/2002

OTHER PUBLICATIONS

Notice with Search Report mailed Oct. 28, 2019, issued in corresponding Swedish Application No. 1851353-1, filed filed Apr. 12, 2019, 9 pages.

(Continued)

*Primary Examiner* — Jeffrey C Pwu
*Assistant Examiner* — Nega Woldemariam
(74) *Attorney, Agent, or Firm* — Sheridan Ross P.C.

(57) ABSTRACT

A method for prioritizing among vulnerabilities in a software code for a user by using a server is presented. The method comprises receiving a request, a software identification associated to the software code, and a user identification associated to the user from a user computer, fetching domain specific knowledge (DSK) data from a DSK database by using the software identification, wherein the DSK database comprises non-user defined features related to the vulnerabilities, fetching user specific knowledge (USK) data from a USK database by using the user identification, wherein the USK database comprises user defined features related to the vulnerabilities, determining utility estimations for the vulnerabilities, respectively, by comparing the vulnerabilities with the DSK data and comparing the vulnerabilities with the USK data, and transferring the utility estimations from the server to the user computer such that a prioritized list of vulnerabilities can be achieved.

18 Claims, 5 Drawing Sheets

(58) Field of Classification Search
USPC .......................................................... 726/21
See application file for complete search history.

(56) References Cited

U.S. PATENT DOCUMENTS

| 2014/0137257 | A1  | 5/2014 | Martinez et al. |
| 2014/0189873 | A1  | 7/2014 | Elder et al. |
| 2017/0078322 | A1* | 3/2017 | Seiver ................. H04L 63/1433 |
| 2018/0124094 | A1* | 5/2018 | Hamdi ..................... G06F 7/24 |

OTHER PUBLICATIONS

Notice mailed Oct. 27, 2021, issued in corresponding Swedish Application No. 1851353-1, filed Apr. 12, 2019, 6 pages.
Farris, K.A., et al., "VULCON: A System for Vulnerability Prioritization, Mitigation, and Management," ACM Transactions on Privacy and Security, vol. 21, No. 4, pp. 16:1-16:28, Jun. 2018.
Gadepally, V.N., et al., "Recommender Systems for the Department of Defense and Intelligence Community," Lincoln Laboratory Journal, vol. 22, No. 1, pp. 74-89, Jan. 2016.
International Search Report and Written Opinion for International (PCT) Patent Application No. PCT/EP2020/059881, dated Jul. 9, 2020, 12 pages.
Official Action for Sweden Patent Application No. 1950462-0, dated Oct. 27, 2021, 6 pages.
Official Action for Sweden Patent Application No. 1950462-0, dated Oct. 28, 2019, 9 pages.

* cited by examiner

METHOD FOR PRIORITIZING AMONG VULNERABILITIES IN A SOFTWARE CODE AND A SERVER

TECHNICAL FIELD

The invention relates to the field of identifying vulnerabilities in software code shared among several stakeholders. More particularly, it is related to a method a method for prioritizing among vulnerabilities in a software code and a server configured to perform the method.

BACKGROUND ART

Today, in the field of software development, it is common practice to include external software components. This may be made for several reasons. One reason may be to be more time-efficient. Put differently, instead of writing a software code in its entirety, a user may use external software components made by other users via e.g. an open source arrangement. Another reason may be to reduce a risk of errors. By downloading and including the external software components, software that is already used by other users is used. An effect of this is namely that a risk of errors can be reduced. Put differently, by sharing software among several users, errors may be identified and corrected more efficiently.

A potential risk with including the external software components is however that the user will have less control over the vulnerabilities and exposures in the software code. One reason for this is that there are components in the software code that are not made by the user himself or herself. Another reason is that the software code often becomes extensive when including external software components. An effect of this is that it is sometimes difficult and more time consuming to handle the software code.

To handle vulnerabilities and exposures in software code development in a systematic manner, common vulnerabilities and exposures (CVE) may be used. CVE is a collection of known vulnerabilities and exposures that are collected and shared such that these can be identified when developing software code. Since different vulnerabilities may be more or less severe, it has been developed different scoring systems, e.g. Common Vulnerability Scoring System (CVSS), to estimate severities of the vulnerabilities. With a system such as this, the user developing the software code can be provided with a list of vulnerabilities, in which each of the vulnerabilities has been assessed on e.g. ease of exploit and impact of exploit.

Two examples of systems for vulnerability prioritization are provided in the articles "VULCON: A System for Vulnerability Prioritization, Mitigation, and Management" by Farris et al. in ACM Transactions on Privacy and Security, Vol. 21, No. 4, Article 16. Publication date: June 2018, and "Recommender Systems for the Department of Defense and Intelligence Community" by Gadepally et al. in Lincoln Laboratory Journal, Volume 22, Number 1, 2016.

Even though the concept of assessing vulnerabilities and exposures in software code is known as such, there is a need for improved tools in this area such that the user developing the software code with external components easily and reliably can identify vulnerabilities in the software code.

SUMMARY

It is an object of the invention to at least partly overcome one or more of the above-identified limitations of the prior art. In particular, it is an object to provide methods and apparatuses that can be used by software developers for efficiently identifying vulnerabilities relevant to their specific needs without requiring extensive and time-consuming training to learn these specific needs.

According to a first aspect it is provided a method for prioritizing among vulnerabilities in a software code for a user by using a server, said method comprising receiving a request, a software identification associated to the software code, and a user identification associated to the user from a user computer, fetching domain specific knowledge (DSK) data from a DSK database by using the software identification, wherein the DSK database comprises non-user defined features related to the vulnerabilities, fetching user specific knowledge (USK) data from a USK database by using the user identification, wherein the USK database comprises user defined features related to the vulnerabilities, determining utility estimations for the vulnerabilities, respectively, by comparing the vulnerabilities with the DSK data and comparing the vulnerabilities with the USK data, and transferring the utility estimations from the server to the user computer such that a prioritized list of vulnerabilities can be achieved.

An advantage with this is that the USK data will provide for that the utility estimations take into account the user preferences, which may be explicitly or implicitly input from the user. At the same time, the DSK data, that may be input from a plurality of different users, will provide for that also in a starting phase, when no or a small amount of USK data is gathered, relevant utility estimations may be provided.

The user defined features in the USK database may comprise first user specific features based on explicit user preferences selected directly by the user, and second user specific features estimated based on user preferences determined indirectly based on the user's interactions with the user computer and/or the server.

An advantage with having the first user specific features, also referred to as knowledge-based system, and the second user specific features, also referred to as content-based system, is that the utility estimations may be formed based on both explicit input from the user as well as implicit input from the user.

The user defined and/or the non-user defined features may be selected from a group consisting of
  Confidentiality impact,
  Integrity impact,
  Availability impact,
  Exploit accessibility,
  Access vector,
  Required privileges,
  Impact metrics,
  Exploitability subscore,
  Privileges required,
  Common Weakness Enumeration (CWE),
  Published date,
  Metasploit exploits,
  Linked external resources, and
  Web search engine hits, such as Google™ hits.

Further, user interaction data linking the user identification to one or several of the user defined features may continuously be collected and stored together with time stamps in a user profile database 102, and the second user specific data may be updated using the user profile database 102.

The step of determining the utility estimations for the vulnerabilities, respectively, by comparing the vulnerabilities with the DSK data and comparing the vulnerabilities with the USK data, may be preceded by determining DSK weights for the DSK data and USK weights for the USK data, wherein the DSK weights are taken into account when comparing the vulnerabilities with the DSK data, and the USK weights are taken into account when comparing the vulnerabilities with the USK data.

The user defined and non-user defined features may have individually set USK weights and/or DSK weights.

By having different weights for different features, it is made possible to pinpoint vulnerabilities of specific interest for the user.

The individually set USK weights may comprise individually set first weights for the first user specific features and/or individually set second weights for the second user specific features.

The step of determining the utility estimations for the vulnerabilities, respectively, may be performed by using a utility function based on similarity functions.

According to a second aspect it is provided a server configured to prioritize among vulnerabilities in a software code for a user such that a prioritized list of vulnerabilities can be provided, said server comprising a transceiver, a control unit and a memory, wherein the transceiver is configured to: receive a request, a software identification associated to the software code, and a user identification associated to the user from a user computer, fetch domain specific knowledge (DSK) data from a DSK database by using the software identification, wherein the DSK database comprises non-user defined features related to the vulnerabilities, fetch user specific knowledge (USK) data from a USK database by using the user identification, wherein the USK database comprises user defined features related to the vulnerabilities, transfer the utility estimations from the server to the user computer, and the control unit is configured to: execute a utility function configured to determine utility estimations for the vulnerabilities, respectively, by comparing the vulnerabilities with the DSK data and comparing the vulnerabilities with the USK data.

According to a third aspect it is provided a computer program product comprising instructions which, when executed on a computer, cause the computer to carry out the method according to the first aspect.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
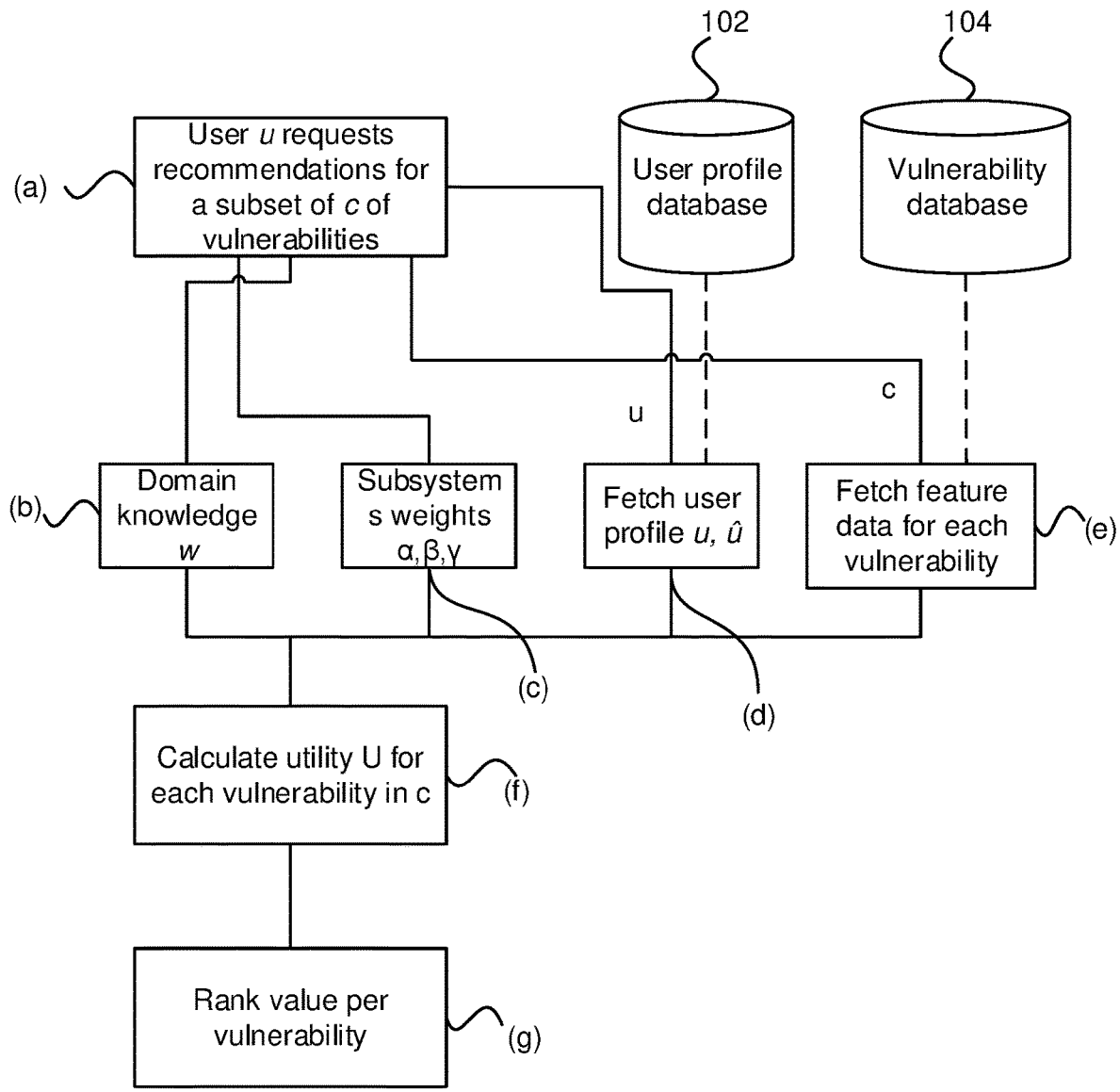
FIG. 1 is a flow chart of a recommendation system.

Below the invention will be described more in detail and by way of example. A list of references is provided in Section 8, and references to these are provided in brackets.

1 Introduction

The current software development landscape shows a trend towards increasing reuse of existing code. Products are constructed by using already existing libraries and software, such as OpenSSL, Apache, libxml, and many others. A report [20], found that in the scanned applications, on average 57% of the code base was open source. However, as a maintainer of products, vendors, also referred to as users herein, need to identify vulnerabilities in the components they use. As the number of external components increases, the workload on developers to identify vulnerabilities and update these components grows. At the same time, many vendors already have a hard time to identify and evaluate vulnerabilities, for example in IoT companies [8].

Updating a component introduces a cost, since it requires a new release cycle to be completed. This includes building, quality assurance, and the distribution of the new release to the end-users' devices. Therefore, vendors would like to patch only vulnerabilities which are relevant to the product. In addition, a vendor may also want to prioritize vulnerabilities: some need to be patched immediately, while some can be delayed until the next ordinary release cycle. Such prioritization can be a challenging task if there are many vulnerabilities that need to be evaluated.

Such a situation can occur if a security analysis of a product is made for the first time, for example by an automated tool to find known vulnerabilities in external dependencies. If the analysis returns many vulnerabilities, every vulnerability would have to be individually assessed, which requires reading and understanding significant amounts of information. The Common Vulnerability Scoring System (CVSS) [4,10] can be used to rank vulnerabilities by calculating a numerical score for each vulnerability. However, this metric does not take into account individual preferences of users during the prioritization phase. Instead, CVSS has an environmental metric which can be used to modify the base score such that it represents user dependent properties of vulnerabilities. It will rewrite the confidentiality, integrity, and availability metrics both to adjust them according to measures already taken by the organization, but also to capture the actual impact such loss would have on the organization. As this will differ between organizations, such a modified metric will better reflect the actual severity of a vulnerability to that organization.

The environmental metrics must be evaluated on a per vulnerability basis and are handled manually. This is both time consuming, error prone, and can lead to inconsistencies in case there are several vulnerabilities and they are handled by different analysts. Moreover, the environmental metric, though unique for the organization, only constitutes the sub-metrics available in the base score. Additional information that might affect the organization is not covered.

Compared to the CVSS environmental metrics, the disclosed method provides several advantages. First, the requirements for the organization are derived by combining explicit requirements with requirements learned from previous analysis of vulnerabilities. This data driven approach will not only use personal preferences, but also take into account how real vulnerabilities have been evaluated previously. Such learned data is able to capture information that might be overseen by analysts, or that are difficult to express. Second, the disclosed approach is general and is not restricted to a certain group of properties. It can be amended with new metrics if needed, focusing on metrics relevant for the given organization or device.

At the same time, the use of recommender systems has become widespread on the Internet. For example, major e-commerce sites provide recommendations of items users are likely to want [18], and streaming services provide recommendations of e.g. movies based on what the user likes [6]. Recommender systems work by analyzing information about user preferences and may combine this with information about the items themselves, or with the history of other users. Regardless of the internal design of the recommender, the output is some recommendation targeting the user.

In this paper, we focus on the prioritization problem by designing a recommender system for vulnerabilities. Our goal is to design a recommender that provides a personalized prioritization based on a user profile. The profile is unique for every user and consists of several parts: it is both explicit, also referred to as explicit or direct herein, based on the users' own choices, and implicit, also referred to as implicit or indirect herein, as the recommender learns from the users' previous actions.

The remainder of this paper is structured as follows: in Section 2 we describe the necessary background of recommender systems and vulnerabilities. In Section 3 the proposed model is described, which is followed by the implementation of the model in Section 4. The recommender is evaluated in Section 5. Related work is discussed in Section 6. Finally, the paper is concluded in Section 7.

2 Recommendation Systems in General

In the general case, the goal of a recommender is to present recommendations of items to a set of users. An item can be for example a movie, a song, an album, a website, or a software vulnerability. The idea is that the recommender should present a subset of items to the user, such that the user finds this subset interesting. For e-commerce sites such as Amazon, this can increase the sales by presenting items the customer is likely to buy. In other cases, such as movie or music recommendations on streaming services like Netflix and Spotify, the recommender is instead something that adds value to the users. It helps users to more easily navigate the large collection of media available. In this paper, the goal of the recommender is similar to this latter case, as we wish to add value to an end-user when prioritizing vulnerabilities.

Recommender systems can loosely be divided into three major categories [1]: knowledge-based systems, content-based systems, and collaborative filtering. Each category of recommenders has different properties and different advantages and drawbacks.

A knowledge-based recommender system can be used in cases where ratings of items are not available. This includes items which are bought rarely, such as automobiles, real estate, or luxury goods. This type of recommender system works on the basis of finding similarities between user requirements and item descriptions. In other words, knowledge-based recommender system allows users to specify desired domain-specific properties of items, and the recommender tries to find suitable items.

In content-based systems item descriptions are used for recommendations. In this type of recommender system, user ratings are combined with content information available for the items. One of the advantages of content-based systems is that when a rating is not available for an item, items with similar attributes that have been rated by the user can be used to make recommendations. On the other hand, because the lacking history of ratings for new users in content-based systems, they are not effective at providing recommendations for new users.

Collaborative filtering systems use collaborative ratings provided by multiple users to make recommendations. Rating metrics in collaborative filtering are sparse. This means that in large set of items, if only a small fraction of them have specified or observed ratings, unspecified or unobserved ratings can be imputed by observed ratings. For example, if two users have similar taste of ratings for many items, their similarity can be identified by the algorithm. But for the cases that only one of them has specified rating, it is very likely that the other user also get the similar value of rating.

In addition to the well-known recommender system types above, recommendations can also be generated by using domain-specific knowledge. This type of system generates recommendations for a specific field of knowledge and is designed specifically to handle data for that particular domain.

The aforementioned recommender systems above work well in defined scenarios, for example, knowledge-based systems are efficient in cold-start settings, collaborative methods works well when a lot of ratings are available. But in some cases, various features of different recommender systems can be combined to achieve better performance. These type of recommender systems are called hybrid systems.

For any recommender to work correctly, there should always be a large database of items so that recommender methods can be applied to them to make recommendations. In case of movies or music there are many sources that can be used, but in case of vulnerabilities there are only a few sources such as NVD CVE (National Vulnerability Database, Common Vulnerabilities and Exposures) which are publicly available. The CVE system provides a centralized repository for publicly known vulnerabilities and exposures. In this paper, a recommender system has been applied to CVEs that are available in NVD.

3 Model

During the design of a recommender system for vulnerabilities, several requirements should be fulfilled. The following requirements have been identified.

1. The recommender should give reasonable recommendations for new users of the system, and thus avoid the cold-start problem of recommender systems.

2. The recommender should allow the user to select certain preferences that the system will honor.

3. The recommender should expose a meaningful subset of user preferences to the user.

4. The recommender should learn from user actions, so that future recommendations are as relevant as possible to the user. To avoid privacy concerns, only the user's own actions are considered.

When constructing a system, the requirements above must be considered in every stage. We first note that no single class of recommender system can fulfill all requirements. As we mentioned earlier, a knowledge-based system would not learn from the user's past behavior, a content-based system would have cold-start problems, and a collaborative-filtering system would lead to privacy concerns in addition to cold-start problems.

As no single class is sufficient, we propose a hybrid recommender based on three parts which together fulfill the requirements above. First, a domain-based subsystem which provides domain-specific knowledge unique to a recommender system for vulnerabilities. Second, a knowledge-based subsystem which allows the user to select certain user preferences that they are interested in. Third, a content-based subsystem which learns from the user's previous actions to provide more meaningful recommendations tailored for each individual user.

While methods based on collaborative filtering have been popular in the literature, they will not be considered further in this paper due to potential privacy issues when recommendations are based on other users' actions.

3.1 Overall Recommender System Design

A high-level overview of the recommendation generation process can be seen in FIG. 1. When a user u requests recommendations for a subset c of vulnerabilities, the actual feature data is extracted from a vulnerability database 104. At the same time, domain-specific knowledge, user profiles, and weights are fetched from their respective storage. Each of these parts will be described in greater detail in the following sections. These pieces will then be combined in the actual recommender generation system, which then outputs recommendations as a real number in the range [0,1]. One such value is generated for each vulnerability in the subset c of vulnerabilities that the user requests. A higher value means that a vulnerability is deemed more interesting to the user.

Figure 2:
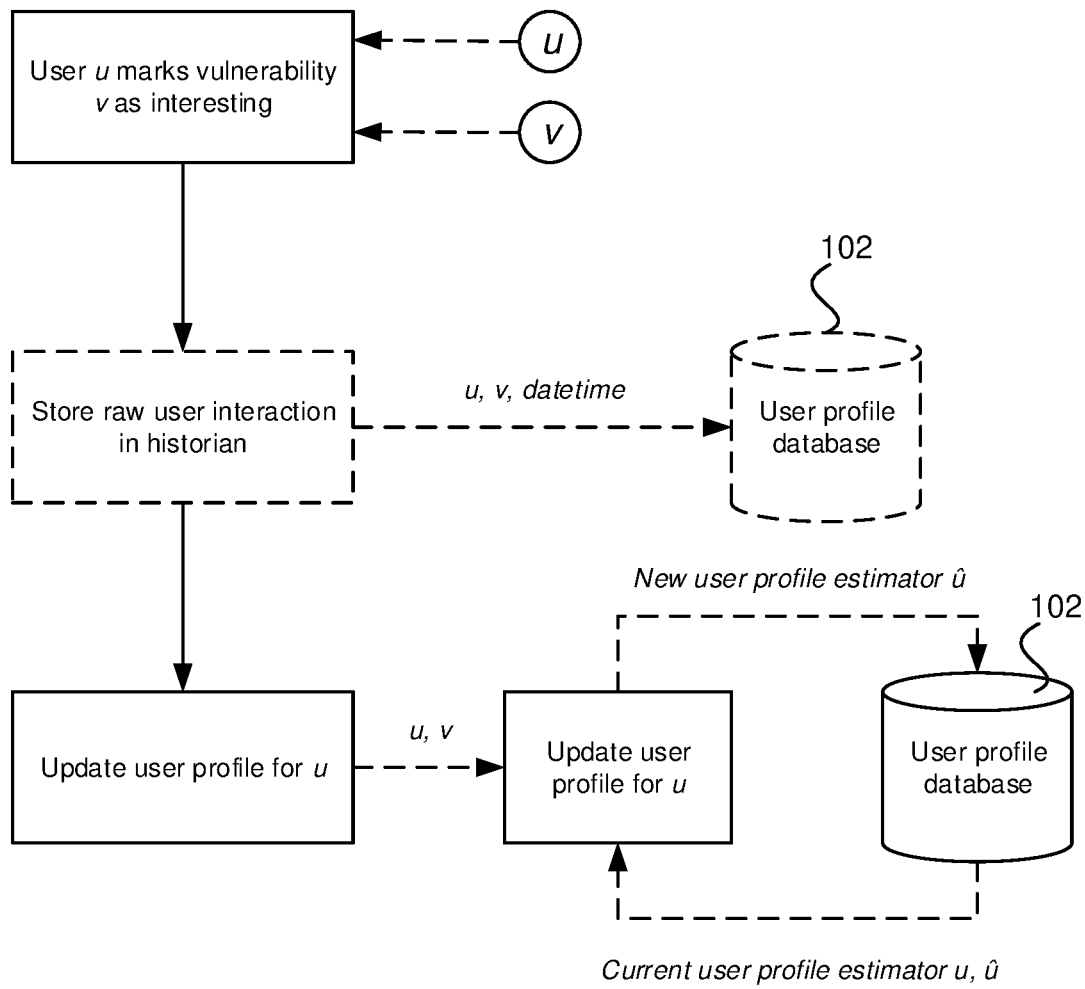
FIG. 2 is a flow chart of a user rating a vulnerability.

Our hybrid recommender system learns user preferences based on the user's interaction with vulnerabilities. An overview of the rating procedure is shown in FIG. 2 by way of example. First, the user u rates a vulnerability based on their own preferences. While such a rating can be of any form, it is herein only considered positive feedback, i.e. a vulnerability that the user has marked as relevant in some way. Then, optionally, user information, vulnerability information, and the current date and time are stored in a historian database. The historian makes it possible to retrain the recommender at a later stage, if the model is changed. Next, the current user profile is updated with the new information, so that a new user profile estimated called û is stored in the user profile database 102. The profile update procedure will be explained in detail in Section 3.8.

3.2 Feature Representation

A key task in designing a recommender is constructing a good feature extraction stage. In our case this means that we wish to extract features from each vulnerability, which will then be used as input to the recommender, as can be seen in block (e) in FIG. 1. First, a selection of features must be made, and later on their respective feature weight parameters must be decided. We will discuss actual features to use in Section 4.1, while here we describe the general approach for how features are represented inside the recommender.

For simplicity, we consider the features of a vulnerability as a vector v, where each individual feature $v_i$ denotes a specific feature value. Such a value could be of any type, such as a boolean value, a real number, an integer in a specific range, categorical data, or hierarchical data. The interpretation and comparison between values would be done by similarity functions, described in Section 3.6.

3.3 User Profile Representation

There can be two distinct parts of the user profile. First, there is the explicit user profile, where the user explicitly selects their preferences. Examples of such a profile could be that the user is mostly interested in vulnerabilities concerning breach of confidentiality but has less interests in vulnerabilities affecting the availability of a system. Second, there can be the estimated user profile, which is determined from the user's interactions with the system. The system learns this profile about the user automatically. This allows the system to capture user preferences that are hard to explicitly express for users, either because the feature is complex, or because the user is unaware of their own preferences. The first part can be the knowledge-based part of our hybrid recommender, also referred to as first user-specific data, while the second part can be the content-based part, also referred to as second user-specific data. They can both be used when generating recommendations, as can be seen from point (d) in FIG. 1.

Both user profiles can be represented as one or more vectors, where each element of the vectors describes the interest the user has for each respective feature. The elements of the vectors can be matched with the feature value from above, to find vulnerabilities to recommend to the user. This matching may be done by a similarity function, which is further discussed in Section 3.6. In the remainder of this paper, the explicit user profile vector is denoted u, while an estimated user profile vector is denoted û. Occasionally, we will consider multiple estimated user profile vectors û. A set of multiple such estimated user profiles will be denoted Û. In Section 3.8 we describe how the estimated user profile vector is found.

3.4 Domain-Specific Knowledge

The recommendations are not entirely based on the user profile, but also on a set of domain-specific knowledge, unique to the field of vulnerability assessment. Such knowledge can be required both to provide recommendations suitable for such a highly specific area of interest, but also serves as a component to solve the cold-start problem.

The domain-specific knowledge can be represented in the same way as the user profile above, but instead of being user-specific, it can be global for all users of the system. It is fetched at point (b) in FIG. 1. It can be used to express rules that should apply for all users, such as prioritizing recent vulnerabilities, or prioritizing vulnerabilities with lots of activity on social media. This vector may be tweaked manually by the designers of the recommender.

3.5 Subsystem Weights

As described earlier, the recommender system can be a hybrid system with three major parts. The three parts all can contribute to the final result of the recommender, but they should be able to do so to different extents depending on the features. Some features can be user independent, while some can be highly user specific. In the same way, some features should be possible to configure explicitly by the user, while some are ill-suited for anything other than automatic configuration. We will return to actual categorization of features in Section 4.1. The subsystem weights can be fetched at point (c) in FIG. 1.

For mathematical simplicity, we consider a solution where each of the three subsystems are given a weight between 0 and 1. Let the vectors α,β,γ describe the weights for the domain-based, knowledge-based, and content-based subsystems, respectively. For any given feature i, the sum $\alpha_i+\beta_i+\gamma_i=1$, such that the contributions from all subsystems sum to one. Note that relative weight of each subsystem can vary between different features.

3.6 Similarity Functions

A similarity function can compare a value from the user profile, called the target value $t_i$, with the feature value extracted from the vulnerability $v_i$. We denote this function $sim_i(t_i, v_i)$. The way the similarity is calculated is highly dependent on the feature type: a numerical feature will have a completely different similarity function compared to a hierarchical one. Therefore, the similarity function $sim_i$ is dependent on the type of feature i. Regardless of input, the similarity function returns a value between 0 and 1, where a higher value means that the feature value is more similar to the target value.

In this paper, we will use the following similarity functions. For examples of other similarity functions, see e.g. [19].

A simple similarity function is the distance between $t_i$ and $v_i$:

$$sim_{dist}(t_i, v_i) = 1 - \frac{|t_i - v_i|}{max_{dist} - min_{dist}}, \quad (1)$$

where $max_{dist}$ and $min_{dist}$ are the maximum and minimum possible distances between $t_i$ and $y_i$. This can guarantee that the output is in the range [0,1].

Another similarity function is a scoring function, which sees the target value $t_i$ as a multiplier to multiply the feature value with. This is suitable when we simply wish to rank higher feature values higher.

$$sim_{mult}(t_i, v_i) = t_i \cdot v_i \quad (2)$$

Note that $t_i$, in this particular example, must be selected so that the output range still stays within [0,1].

In the two previous similarity functions, both the target value $t_i$ and the feature value $v_i$ have been numerical values. However, as described earlier in Section 3.2, they can be of any type. Two examples of such similarity functions are $sim_{daydist}$ and $sim_{cosine}$, which calculates the difference between two dates, and the cosine similarity between two vectors, respectively. The date similarity is compared as:

$$sim_{daydist}(t_i, v_i) = 1 - \frac{daysBetween(t_i, v_i)}{t_i - earliestDate}, \quad (3)$$

where $t_i$ is today's date.

The cosine similarity is calculated using the following function, where $t_i$ and $v_i$ are themselves vectors as opposed to scalar values.

$$sim_{cosine}(t_i, v_i) = \frac{\sum_{i=1}^{n} t_{ij} v_{ij}}{\sqrt{\sum_{i=1}^{n} t_{ij}^2} \sqrt{\sum_{i=1}^{n} v_{ij}^2}}, \quad (4)$$

where $t_{ij}$ and $v_{ij}$ are the $j^{th}$ components of the vector $t_i$ and $v_i$ respectively.

A special case is a similarity function for Boolean values. In this case, $t_i$ is simply a constant which is returned if $v_i$ is true.

$$sim_{boost}(t_i, v_i) = \begin{cases} t_i, & \text{if } v_i \text{ is true,} \\ 0, & \text{otherwise} \end{cases} \quad (5)$$

Note that the similarity functions as described above follows the definition from [19], where the similarity function compares individual feature values. Other definitions of similarity metrics operate on all feature values rather than individual elements. We will also construct such a function, called the utility function, later in Section 3.7, where the individual similarity functions from this section will be used as building blocks.

3.7 Generating Recommendations

Combining the building blocks from the sections above, a complete recommender system can now be described. The goal here is to describe a utility function U, which takes a given vulnerability v as input, and outputs the utility of this vulnerability, i.e. how good it fits the user's interests. As can be seen at point (f) in FIG. 1, the utility function U is the final step in a series of actions, which ends with a ranking. The utility function is applied to all vulnerabilities in the current context, for example a list of vulnerabilities applicable to the user's software environment.

Recall that the goal is to construct a hybrid recommender which combines data from the three parts. Therefore, the subsystem weights will be combined with the similarity functions for the different feature values for all d features. The utility U for vulnerability can then be described as:

$$U = \frac{1}{d} \sum_{i=1}^{d} \alpha_i \cdot sim_i(w_i, v_i) + \beta_i \cdot sim_i(u_i, v_i) + \gamma_i \cdot sim_i(\hat{u}_i, v_i), \quad (6)$$

where $\alpha_i, \beta_i, \gamma_i$ are the subsystem coefficients, $sim_i$ is the similarity function for the $i^{th}$ feature, $w_i, u_i, \hat{u}_i$ are the target values for feature i for the different subsystems (i.e. elements of w, u, û respectively), and vi is the feature value for feature i. If there are several û, the one which maximizes U is selected.

Because the similarity functions are limited to the range [0,1], and $\alpha_i + \beta_i + \gamma_i = 1$, the output of U will be a value between 0 and 1. A higher value indicates higher utility, i.e. a better match to the user's preferences. This is the final output from the recommender, and a user interface can now use this utility value to present the vulnerabilities to the user, for example by sorting so that vulnerabilities with higher utility is presented first.

3.8 Updating User Profile

For estimating the user profile û, we wish to combine the previous estimation with the new data about the user's preferences. While input to a recommender can vary greatly depending on context, this work assumes input of only vulnerabilities that the user is interested in, that is, only positive training examples. Then, the update function update can be expressed as a function of the form $$\hat{u}' = update(\hat{u}, v), \quad (7)$$

i.e., a function taking a new (liked) vulnerability v, together with the current û, and returning a new estimation of the user preferences û'.

Depending on what kind of user preferences the system should model, there are different ways to design the update function. In [11] the authors used the vector space model to represent text from web pages. The user profile was represented as a single vector û, motivated by users having continuously changing and short-lived interests. Therefore the authors represented their update function as $\hat{u}' = a \cdot \hat{u} + v$, where a is a decay factor. Since the vectors had weights determined by the tf-idf scheme, in combination with using the cosine similarity measure, simple addition of the vectors worked well as an update function, because the cosine similarity measures vector orientation, not magnitude.

A similar approach was used in [2], where the authors instead propose the use of multiple û-vectors for a single user. The choice is motivated by users having different interests, and a single û vector would not be effective in capturing this. The authors choose a fixed number of vectors N, and uses clustering to merge nearby vectors to limit the number of vectors to N.

We propose an approach inspired by the two articles above, with some adaptions to make the update function applicable for any type of feature, not only text. The proposed update function has the following form:

$$update(\hat{u}, v) = (mer_1(\hat{u}_1, v_1), \ldots, mer_i(\hat{u}_i, v_i), \ldots,$$
$$mer_d(\hat{u}_d, v_d)), \quad (8)$$

where d is the number of features, and therefore elements in $\hat{u}$ and $v$. Also, $\hat{u}$ is the user profile vector most similar to $v$, measured using the element-wise similarity functions, i.e. the vector $\hat{u} \in \hat{U}$ maximizing $\Sigma_{i=1}^{d} \gamma_i \text{sim}(\hat{u}_i, v_i)$.

For each pair $(\hat{u}_i, v_i)$, a merge function $\text{mer}_i$ is applied. The merge function is similar to the similarity functions $\text{sim}_i$, but instead of comparing two elements, it merges them. The merging needs to be handled different for each feature type, and this construction is thus a generalization of [2,11], where the merge function is equivalent to $\text{mer}_i(\hat{u}_i, v_i) = \hat{u}_i + v_i$.

Another example of a more complex merge function, used later in this paper, is a merge function based on the Modified Moving Average (MMA):

$$\text{mer}_{mma}(\hat{u}_i, v_i) = \frac{(S-1)\hat{u}_i + v_i}{S}, \qquad (9)$$

where S controls the exponential smoothing.

Just as in Section 3.6, where similarity functions could handle both scalars and vectors, depending on the feature type, merge functions must support this as well. Consider the case where $\hat{u}_i$ and $v_i$ are vectors, then the following merge function performs element-wise addition:

$$\text{mer}_{add}(\hat{u}_i, v_i) = (\hat{u}_{i,1} + v_{i,1}, \hat{u}_{i,2} + v_{i,2}, \ldots, \hat{u}_{i,n} + v_{i,n}), \qquad (10)$$

where n is the dimension of the vectors $\hat{u}_i$ and $v_i$.

4 Implementation

Given the theoretical model described in the previous section, the actual recommender can now be constructed. At first, the set of features must be selected. While the proposed model is flexible enough to handle many different feature types, an actual implementation must still have suitable similarity functions, merge functions, and subsystem weights for all selected features. The goal of this section is to document such decisions for our implemented recommender, which will later be evaluated in Section 5. We stress that this is an example implementation of the model described in the previous section. Another implementation may choose different features, weights, or functions.

4.1 CVE Features

The implementation has used several sources for vulnerability information. A majority of the data is collected from NVD [14], but also other sites such as CVEdetails [12], and Google have been used. A list of different features extracted from these sources is available in Table 1, and an explanation and motivation of the features follows below.

TABLE 1

Feature selection in the implementation, feature types, weights of domain-based ($\alpha$), knowledge-based ($\beta$), and content-based ($\gamma$) subsystems, and finally similarity and merge functions

| | | Subsystem weights | | | Functions | |
|---|---|---|---|---|---|---|
| Features | Data type | $\alpha$ | $\beta$ | $\gamma$ | sim | mer |
| Impact metrics | Categorical | 0.0 | 0.5 | 0.5 | $\text{sim}_{mult}$ | $\text{mer}_{mma}$ |
| Exploitability subscore | Numerical | 0.0 | 0.8 | 0.2 | $\text{sim}_{mult}$ | $\text{mer}_{mma}$ |
| Privileges required | Categorical | 0.3 | 0.35 | 0.35 | $\text{sim}_{mult}$ | $\text{mer}_{mma}$ |
| Access vector | Categorical | 0.3 | 0.35 | 0.35 | $\text{sim}_{dist}$ | $\text{mer}_{mma}$ |
| CWE | Hierarchical | 0.0 | 0.0 | 1.0 | $\text{sim}_{cosine}$ | $\text{mer}_{add}$ |
| Published date | Date | 1.0 | 0.0 | 0.0 | $\text{sim}_{daydist}$ | N/A |
| Metaspolit exploits | Boolean | 0.3 | 0.7 | 0.0 | $\text{sim}_{boost}$ | N/A |
| Linked external resources | Numerical | 1.0 | 0.0 | 0.0 | $\text{sim}_{mult}$ | N/A |
| Google hits | Numerical | 1.0 | 0.0 | 0.0 | $\text{sim}_{mult}$ | N/A |

CVSS impact metrics This includes impact metrics directly from the CVSS score: confidentiality impact, integrity impact, and availability impact. These are categorical values where the impact can be NONE, LOW, or HIGH. In our implementation, we map these values to numerical scores of 0.0, 0.5, and 1.0 respectively. These metrics are interesting since they describe how serious the impact is on different security properties. We consider vulnerabilities with higher impact values as more serious.

CVSS exploitability subscore This is the exploitability subscore from the CVSS ranking, which estimates the ease of exploiting the vulnerability. This is a numerical value between 0.0 and 10.0. This metric is interesting since a higher value means that the vulnerability is easier to exploit. Therefore, we consider such vulnerabilities as more serious.

CVSS privileges required This CVSS metric describes how much privileges an attack needs before performing an attack. It is a categorical feature with values NONE, LOW, or HIGH. In our implementation, we map these values to numerical scores of 1.0, 0.5, and 0.0 respectively. This is interesting since if lower privileges are required, then a vulnerability is easier to exploit. Thus, we regard vulnerabilities with lower required privileges as more serious.

CVSS access vector This CVSS metric describes the attack vector for the vulnerability. It is categorical with the value NETWORK, ADJACENT, LOCAL, PHYSICAL. In our implementation, we map these to numerical values of 1.0, 0.5, 0.0, and 0.0 respectively. The access vector is relevant since different users have different threat models. Some users may consider network attacks as most serious, while others may perceive local or physical attacks as more serious. Later in the paper we will describe how the recommender allows the user to describe their preferences.

CWE The CWE ID categorize vulnerabilities according to the type of the vulnerability. This is a hierarchical structure, but we treat each individual CWE as a category in our implementation, because there is only a limited set of all possible CWE IDs that are actually used in CVEs. We expect the CWE to be important in providing recommendations based on the user's history, since it describes the vulnerability class.

Metasploit exploit available This is a Boolean value which describes if there is a Metasploit module [16] available for this vulnerability. A module in Metasploit means that attackers may find and launch attacks through easy to-use tools. Thus, such vulnerabilities are considered more serious.

Number of linked external resources This is a numerical value which counts the number of linked resources for a specific CVE on NVD. These resources may include links to news articles, exploits, or security advisories. A vulnerability with a high amount of external resources may be more relevant to look into during the prioritization phase.

Google hits This is a numerical value of the number of Google search hits a specific CVE-ID has. Just like the number of linked external resources, this tells the recommender something about the popularity of the vulnerability in the Internet community.

4.2 User Requirements Selection

When users start using the service, they should select what makes certain vulnerabilities more relevant to them. This can be used to create the explicit user profile for the recommender. The user profile can be constructed by rating the importance of certain information about a vulnerability. The rating should be, in this example, in the interval of [0,1], since it will map directly to entries in the user profile vector u described earlier.

While the user requirements can be done in many ways, in our example implementation the user can rate the following properties:

Confidentiality impact: To what extent the vulnerability may cause private information to be leaked to an attacker.

Integrity impact: To what extent the vulnerability may cause stored information to be modified by an attacker.

Availability impact: To what extent the vulnerability may cause a system to be unavailable to perform its normal functions.

Exploit accessibility: How widely accessible or easily used attack code that can be found for the vulnerability.

Access vector: What access vector that is used for the attack, e.g. if network access is enough, or if local access is required.

Required privileges: If the vulnerability requires an already authenticated user, of if unauthenticated users can trigger the vulnerability as well.

4.3 Subsystem Weights

The choice of subsystem weights for each individual feature is based on two main aspects.

1. Is it meaningful for users to explicitly state their preference about the feature?

2. Do users' preferences for the feature differ, or do all users value the feature in the same way?

In addition, as described in Section 3.5, the subsystem weight should together, in this example, sum to one for each system. Recall that $\alpha, \beta, \gamma$ corresponds to the domain-based, knowledge-based, and content-based parts of the recommender, respectively. In Table 1 the choice of subsystem weights for each feature can be seen. While a motivation for our choice of weights will follow shortly, note that these are not the only possible choices. Another implementation may select the weights in a different way.

We start by looking at the impact metrics. Since these metrics are highly user-dependent, the domain-based part is set to 0.0, so that the user's explicit choice and history are the only things affecting the score for the impact metrics. In addition, an even split between explicit (knowledge-based) and implicit (content-based) user preferences is selected. Similar arguments can be made for the Exploitability subscore, but since we wish the users to have a higher degree on explicitly selecting the importance of this setting, we have a larger $\beta$ for this case.

The Privileges required and Access vector features have a non-zero domainbased component, since the importance of these factors can be considered more universal across users.

Looking at the CWE value, this is however completely user-dependent. In addition, since there is a multitude of available CWE, the recommender solely learns the user profile based on the user's previous action. Thus, both the domain-based and knowledge-based components are zero.

The opposite is true for the date of publication, which is treated equally for all users, thus marking more recent vulnerabilities as more important. The same argument can be made for the number of linked external resources, and for the number of Google hits.

Finally, the availability of Metasploit exploits is seen as a combination of a domain-based and knowledge-based preference.

4.4 Similarity and Merge Functions

The choice of similarity and merge functions are described in Table 1. Refer to Section 3.6 for the actual definitions of the similarity functions.

In general, $sim_{mult}$ is the most common similarity function, since it maps a higher feature value to a more important vulnerability, by multiplying with some factor. This is a good fit for features which themselves have values ranging from less to more serious.

Considering a few special cases, such as Access vector, the $sim_{dist}$ distance similarity function is used instead, since this instead measures how close the feature value is to the user's preference. In this way, the user can select to rank e.g. local attacks higher than network-based attacks.

The Metasploit and date of publication features have fairly straightforward similarity functions based on their data type, while the CWE feature requires the use of the $sim_{cosine}$ similarity to correctly handle the comparison between vectors of CWEs.

If we instead look at merge functions, a modified moving average $mer_{mma}$ is used for most features, since it provides a simple way to converge towards to user's preference. For CWE, the special $mer_{add}$ function needs to be used such that the vector of previously seen CWEs are merged with the newly rated CWE.

Finally, certain features do not need merge functions, since their content based component $\gamma$ is 0, and thus does not affect the final recommender output. These are marked as N/A in Table 1.

5 Evaluation

In this section we present an initial evaluation of our recommender system. The main purpose of the evaluation is to determine if the system fulfills its goals, which in our case is recommending CVEs to the users according to their own preferences.

There are three common types of evaluation techniques for recommender systems: user studies, online methods, and offline methods. In user studies, feedback is collected from users before, during, and after they use the recommender system. In online studies, information is collected from an already running recommender, for example using A/B testing, so that results from two different groups with recommenders can be compared. Finally, in offline methods, an already existing data set of historical data is used to evaluate the recommender, without requiring ongoing interactions from users.

An online evaluation requires an already existing user base, which makes it difficult to use in our setting where we evaluate a new recommender. While offline evaluation methods are popular in recommender system evaluation [1], it requires the availability of historical data, which is domain specific. While data sets such as the Netflix Prize data set [13] is widely used, it cannot be used to evaluate a recommender system for vulnerabilities.

Because of the reasons above, we have decided to collect our own offline data set from users. This is similar to the user study approach described above, but the users do not actually use the recommender system, instead we ask them to manually provide their user profile, and rank a subset of vulnerabilities manually. These results are then used as a data set to evaluate the recommender.

5.1 Evaluation Metrics

There are several different metrics used in recommender system evaluation. However, care must be taken to select metrics that are suitable to the type of recommender in question. Two common metrics are precision and recall, which both measure the frequency with which a recommender system makes relevant decisions. While common, these metrics are ill-suited for our recommender, since they consider recommender systems where the goal is to produce a subset of items from a larger collection. In the vulnerability recommender, the recommendations are instead rankings for a given set of vulnerabilities, where it does not make sense to talk about precision and recall. Instead, we wish to measure the deviation between the recommender's rankings and the actual rankings.

To do this, we have chosen predictive accuracy metrics, and rank accuracy metrics, as these metrics are closer to the goal of recommender systems similar to ours [3,17]. Predictive accuracy metrics measure how close the recommender system's predicted ratings are to the true user ratings [7]. Root Mean Square Error (RMSE) is probably the most popular metric used in evaluating accuracy of predictive ratings. The system generates predicted ratings $\hat{r}_{ui}$ for a test set L of user-item pairs (u,i) for which the true ratings $r_{ui}$ are known. The RMSE between the predicted and actual ratings is [7]:

$$RMSE = \sqrt{\frac{1}{|L|} \sum_{(u,i) \in L} (\hat{r}_{ui} - r_{ui})^2} \quad (11)$$

The other type of metric, rank accuracy metrics, measure the ability of a recommender system to produce an ordering of items that matches how the user would prefer to have them ordered. To be able to evaluate based on rank accuracy, it is necessary to obtain reference ranking. We used the Yao's Normalized Distance-based Performance Measure (NDPM) [21] as rank accuracy metric, which calculates the difference between the order of items in preferred user order, and the system's recommendation order. The NDPM can be calculated as follows [7]:

$$NDPM = \frac{C^- + 0.5 u^0}{C^u} \quad (12)$$

where $C^-$ is the number of contradictory preference relations between the system ranking and the user ranking. A contradictory preference relation happens when the system says that one item will be preferred to another item, and the user ranking says the opposite. $C^{u0}$ is the number of compatible preference relations, where the user rates one item higher than another item, but the system ranking has those 2 items at equal preference levels. $C^u$ is the total number of preferred relationships in the user's ranking [7].

The NDPM value varies between 0 and 1, where 0 means that the orderings are identical, and 1 means the ordering is completely reversed.

5.2 Experiment Results

In this section we want to evaluate the performance of the proposed recommender system. In order to do this we selected a subset of CVEs, and then compared the recommendations made by the system against both a manual ranking done by users, and the CVSS score. Further, even though not described below, comparisons between the recommendations made by the system and CVSS environmental score also present a clear difference.

For this evaluation, 8 users have been asked to participate. The users are working in the industry, for five different companies, and are people with high security awareness. The rationale for this selection is that these people are potential users of such a recommender. Each user started by selecting their own user profile, with preferences as described in Section 4.2.

A selection of 30 sample CVEs were selected. The CVEs were from different products, different years, described different types of vulnerabilities, and were presented in a random order. The users were then asked to rank these CVEs on a scale from 0 to 10, where a higher value indicated that the CVE was more interesting to them. The users were asked to only consider the properties of the CVE itself, rather than the product it affected. To avoid bias from the CVSS score, this score, as well as the impact and exploitability subscores, were hidden from the user during the evaluation. The users could, however see other information in the CVE so that they could make an informed decision based on the CVE data.

After collecting the data, we proceed with the actual evaluation. The CVEs were divided into training and test sets using k-fold cross-validation [9], using k=5. We performed an evaluation where both the user profile and the training set were used to train the recommender, before generating recommendations. As a comparison, we also compared the results to just using the CVSS2 score, without the recommender system. For all cases, the reference ranking was the manual ranking performed by the users.

The RMSE and NDPM values were then calculated between the reference ranking and the recommender output, and between the reference ranking and the CVSS2 score. The metrics can be seen in Table 2. We see that the RMSE values of the recommender system are lower compared to the CVSS scores. This indicates that the recommender has higher predictive rating accuracy for all users in comparison to just using the CVSS score. The results also indicate higher rank accuracy in comparison to CVSS based on the NDPM metric. The NDPM values of the recommender are better for almost all test users, except user 5.

5.3 Cold-start Evaluation

We also examined the recommender system's performance in a cold-start scenario, where a user is newly registered to the system. For cold-start evaluation we do not consider learning based on the training set, and the corresponding RMSE and NDPM values had been calculated only based on user preferences at registration time. RMSE and NDPM values for cold-start evaluation are shown in Table 3. The values indicate that the accuracy of the recommender system for cold-start users is better compared to just sorting by the CVSS score. Also, comparing RMSE and NDPM values in Table 2 with values from Table 3 shows we got slightly better results after training in comparison to cold-start situation for the majority of the users.

TABLE 2

RMSE and NDPM of recommender system and CVSS, relative the reference ranking, for different users

|  | RMSE | | NDPM | |
| --- | --- | --- | --- | --- |
|  | Recommender | CVSS | Recommender | CVSS |
| User 1 | 0.180 | 0.270 | 0.303 | 0.335 |
| User 2 | 0.244 | 0.325 | 0.183 | 0.220 |
| User 3 | 0.199 | 0.216 | 0.190 | 0.259 |
| User 4 | 0.150 | 0.235 | 0.172 | 0.206 |
| User 5 | 0.160 | 0.237 | 0.287 | 0.195 |
| User 6 | 0.136 | 0.228 | 0.163 | 0.186 |
| User 7 | 0.119 | 0.175 | 0.154 | 0.232 |
| User 8 | 0.198 | 0.286 | 0.342 | 0.354 |

TABLE 3

RMSE and NDPM of recommender system and CVSS, relative the reference ranking, for the cold-start evaluation

|  | RMSE | | NDPM | |
| --- | --- | --- | --- | --- |
|  | Recommender | CVSS | Recommender | CVSS |
| User 1 | 0.182 | 0.270 | 0.305 | 0.335 |
| User 2 | 0.239 | 0.325 | 0.193 | 0.220 |
| User 3 | 0.200 | 0.216 | 0.195 | 0.259 |
| User 4 | 0.146 | 0.235 | 0.172 | 0.206 |
| User 5 | 0.158 | 0.237 | 0.291 | 0.195 |
| User 6 | 0.132 | 0.228 | 0.165 | 0.186 |
| User 7 | 0.125 | 0.175 | 0.158 | 0.232 |
| User 8 | 0.202 | 0.286 | 0.347 | 0.354 |

5.4 Run-Time Performance

Figure 3:
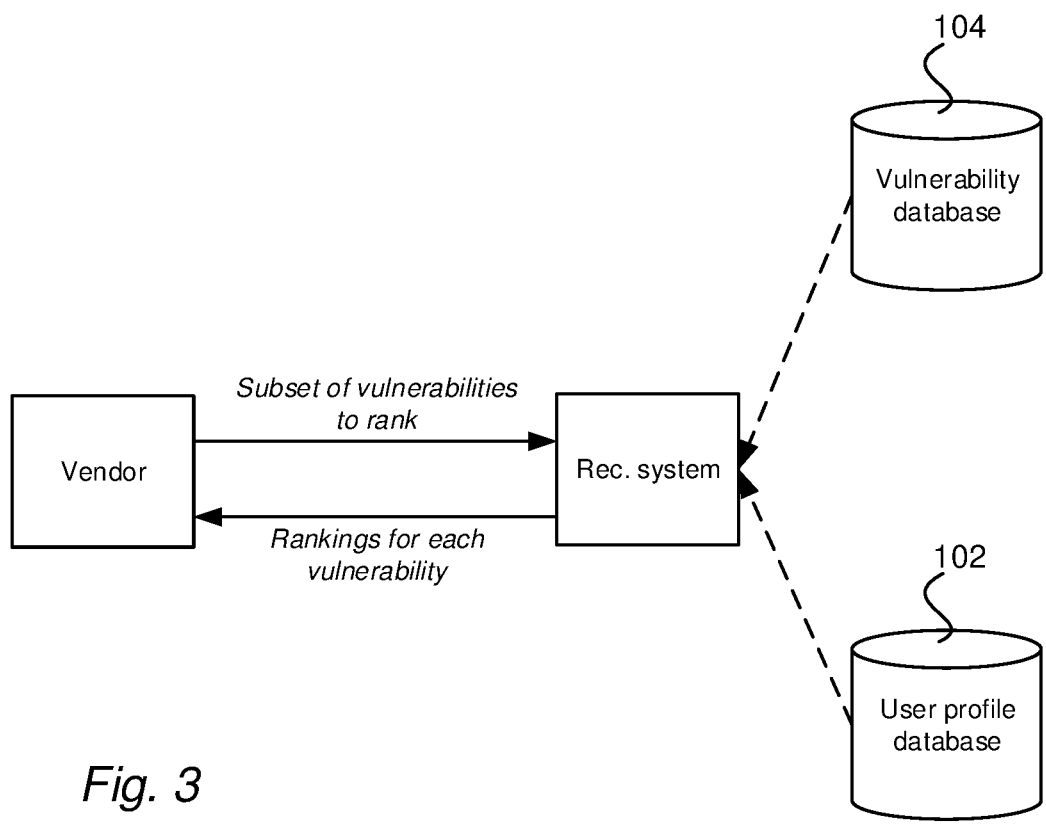
FIG. 3 is a flow chart for measuring run-time performance of recommendation generation.

While the current implementation is not optimized for speed, we have still made a small benchmark of the run-time performance of recommendation generation. Consider the scenario given in FIG. 3. A vendor wishes to get a ranking for a subset of CVEs. This could be for example a subset of vulnerabilities relevant for software that is in use in a product, which now needs to be analyzed for security weaknesses. Such a list of CVEs could for example be obtained by automated analysis of software dependencies. The result from the recommender system is a ranked prioritization of the provided subset of vulnerabilities.

The run-time performance has been evaluated by calling the recommender system with different sized subsets of CVEs, ranging from 30 to 2000 CVEs. The results can be seen in Table 4, which shows the total time to rank different-sized subsets. The results are the average values over 20 runs.

TABLE 4

Run-time performance of the recommender depending on size of the input list of CVEs to rank

| CVEs | 30 | 100 | 500 | 1000 | 2000 |
| --- | --- | --- | --- | --- | --- |
| Time (ms) | 77 | 95 | 162 | 251 | 441 |

6 Related Work

In [15] the authors used a recommender system to weigh the paths in attack path discovery to find which paths are more likely to happen. They proposed a method which takes elements from both collaborative filtering recommender systems and attack path discovery methods to identify attacks paths and also to predict attacks. Attack graphs show every possible path that an attacker can use to gain further privileges. To build the attack graph, they utilized information from open sources such as CWE and CVE. Then they utilized an algorithm to discover the attack path.

In the attack prediction stage, they used a collaborative filtering algorithm with attack paths and vulnerabilities as input, and predicted attacks as output. In the algorithm, they calculate similarity values to find the similarities between ratings of different users. Then they rearrange the order of the k nearest neighbors according to the similarity and co-rated items. Finally, depending on the similarity value returned and the common vulnerabilities, they classify the attacks in attack paths from very high to very low.

Another recommender system [5] had been developed by the Department of Defense and Intelligence Community at Lincoln Laboratory which can hasten analysts' responses to complex events such as cyber attacks.

The common way of developing an appropriate response by a security team is to consider many factors such as the time since the vulnerabilitys discovery, severity of the exploit, existence of a patch, difficulty of deploying the patch, and impact of the patch on users. But recommender systems can provide a mechanism to greatly simplify this response process. Recommender systems can use prior information about the vulnerabilitys severity and impact to the user community to suggest a course of actions for patching the vulnerability. Department of Defense and Intelligence Community (DoD and IC) is a governmental entity and applying recommender systems is not as easy as commercial entities, there are some challenges such as difficulty of quantifying success, serious consequences of decisions, no representation of past in future and etc in applying recommender systems to DoD and IC. Lincoln Laboratory uses some programs that incorporate recommender systems, such as Dynamic Customization of Content Filtering, Delve, Global Pattern Search at Scale and so on.

In recommender systems mentioned above [5,15], the input of the recommenders is quite similar to our proposed recommender, namely information about vulnerabilities and some other types of information related to vulnerabilities. But the purpose of these recommender systems are totally different with ours. In [15], the goal of the recommender is to classify attack path likeliness from high to low, while in [5] the purpose is to suggest actions to the users in case they want to patch a vulnerability. Meanwhile, in our recommender system the goal is recommending CVEs to users according to their own preferences.

7 Conclusions

Managing software security is getting increasingly more challenging for vendors, as they incorporate existing external libraries in their own code. To aid in the prioritization process when evaluating vulnerabilities, we have developed a recommender system for this purpose. The recommender system is specialized for vulnerabilities, and is designed to be useful specifically for the context of vulnerability assessment. Recommendations are generated by considering both users' explicit preferences, and by considering their previous interactions with the recommender. The system can be used with a variety of different inputs, and can easily be extended with new features if desired.

The recommender has been implemented to be able to evaluate the performance. The evaluation shows that the recommender in general gives better recommendations compared to just using the CVSS score.

8 A method and server for prioritizing among vulnerabilities

Figure 4:
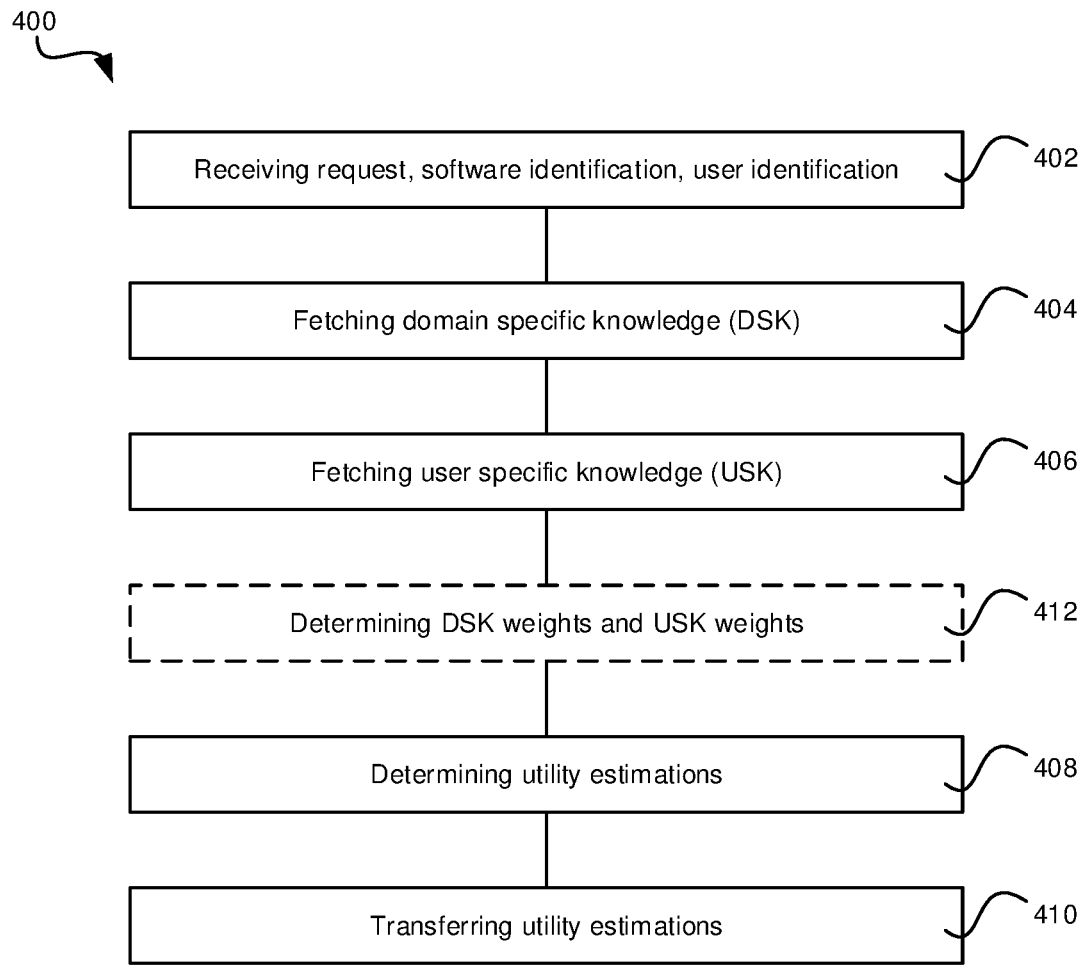
FIG. 4 is flow chart illustrating a method for prioritizing among vulnerabilities in a software code for a user.
Figure 5:
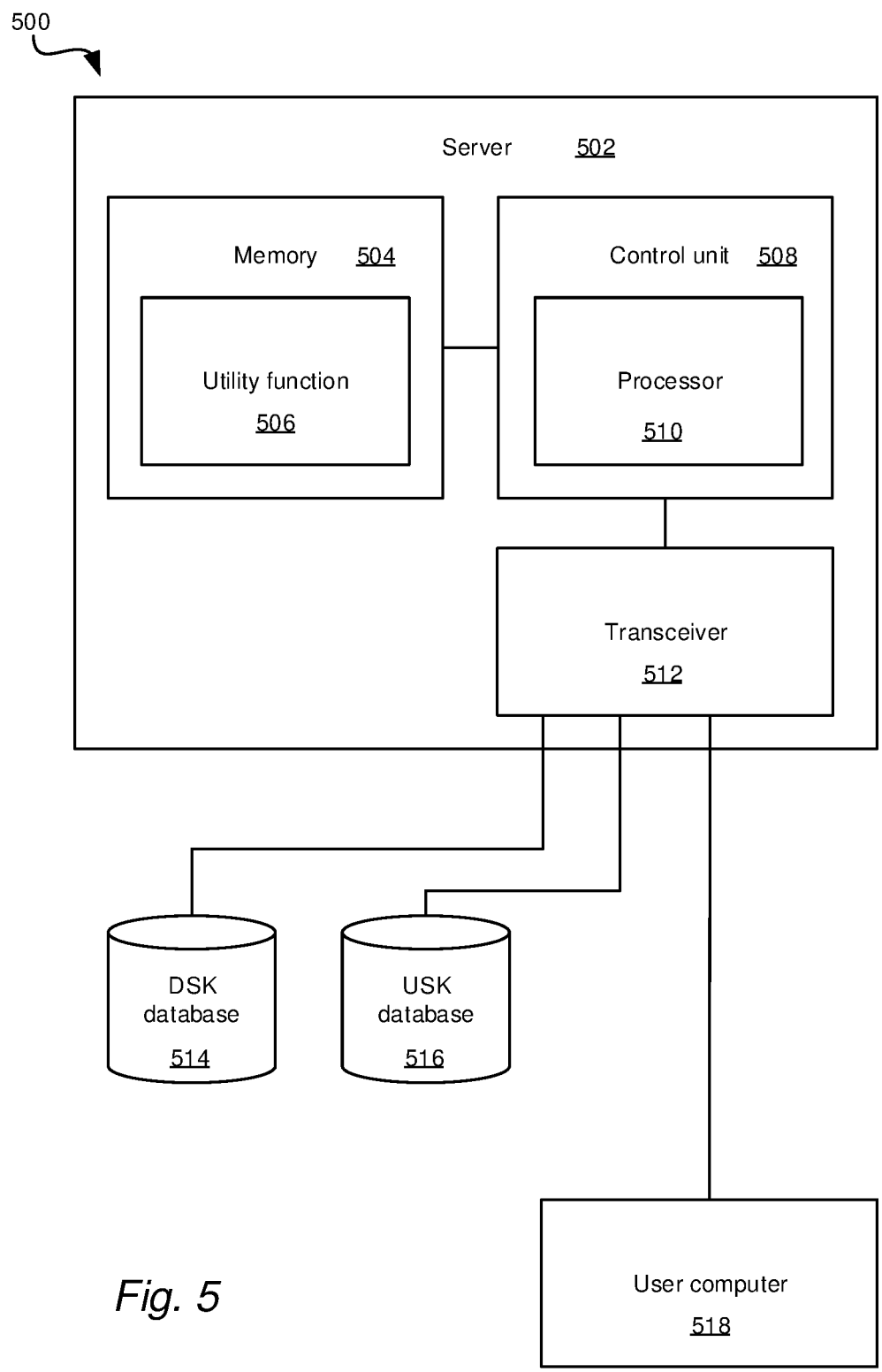
FIG. 5 illustrates a system comprising a server configured to prioritize among vulnerabilities.

In FIG. 4 it is provided a flowchart illustrating a method 400 for prioritizing among vulnerabilities for a user using a server, e.g. a server 502 illustrated in FIG. 5. In a first step 402, a request, a software identification associated to the software code, and a user identification associated to the user from a user computer can be received by the server. In a second step 404, by using the software identification, domain specific knowledge (DSK) data can be fetched from a DSK database, wherein the DSK database comprises non-user defined features related to the vulnerabilities. In a third step 406, which may be executed in parallel, before or after the second step 404, by using the user identification, user specific knowledge (USK) data can be fetched from a USK database, wherein the USK database comprises user defined features related to the vulnerabilities. In a fourth step 408, utility estimations for the vulnerabilities can be determined, respectively, by comparing the vulnerabilities with the DSK data and comparing the vulnerabilities with the USK data. Finally, in a fifth step 410 the utility estimations can be transferred from the server to the user computer such that a prioritized list of vulnerabilities can be provided. The prioritization list may be made in the server 502 or it may be made in the user computer 518, or partly made in the server and partly in the user computer.

Optionally, in a sixth step 412, DSK and/or USK weights can be determined. By having these weights, as explained more in detail in the examples provided above, the DSK and the USK data may be to a higher or lesser degree taken into account when comparing this data with the vulnerabilities.

FIG. 5 illustrates a system 500 comprising the server 502 comprising a memory 504, in which software code for the utility function 506 may be stored, a control unit 508, in turn comprising a processor 510, and a transceiver 512. The server 502 can be communicatively connected to a DSK database 514, a USK database 516 and a user computer 518 from which the request, the software identification and the user identification may be sent to the server 502, and to which the utility estimations may be sent from the sever 502.

As will be readily understood by the skilled person, the system 500 may be embodied in numerous ways. For instance, even though the DSK and the USK databases 514, 516 are illustrated as two separate databases, they may be comprised in one and the same storage device or several different storage devices. Further, even though not illustrated as a cloud computing environment, the system 500 may be partly or fully implemented by using a cloud service.

From the description above follows that, although various embodiments of the invention have been described and shown, the invention is not restricted thereto, but may also be embodied in other ways within the scope of the subject-matter defined in the following claims.

REFERENCES

1. Aggarwal, C. C.: Recommender Systems. Springer (2016)
2. Chen, L., Sycara, K.: Webmate: A personal agent for browsing and searching. In: Proceedings of the Second International Conference on Autonomous Agents. pp. 132-139. AGENTS '98, ACM (1998)
3. Degemmis, Marco, P. L., Semeraro, G.: A content-collaborative recommender that exploits wordnet-based user profiles for neighborhood formation. User Modeling and User-Adapted Interaction 17(3) (2007)
4. First: Common vulnerability scoring system v3.0: Specification document, https://www.first.org/cvss/specification-document
5. Gadepally, V. N., et al.: Recommender systems for the department of defense and the intelligence community. MIT Lincoln Laboratory Lexington United States (2016)
6. Gomez-Uribe, C. A., Hunt, N.: The netflix recommender system: Algorithms, business value, and innovation. ACM Trans. Manage. Inf. Syst. 6(4), 13:1-13:19 (December 2015)
7. Gunawardana, A., Shani, G.: Evaluating recommender systems. Recommender systems handbook, Springer, Boston,MA. (2015)
8. Höst, M., et al.: Industrial practices in security vulnerability management for iot systems an interview study. In: Proceedings of the 2018 International Conference on Software Engineering Research & Practice. pp. 61-67 (2018)
9. Kohavi, R.: A study of cross-validation and bootstrap for accuracy estimation and model selection. Ijcai 14(2) (1995)
10. Mell, P. M., et al.: A complete guide to the common vulnerability scoring system version 2.0 (2007), https://www.nist.gov/publications/complete-guide-common -vulnerability-scoring-system-version-20
11. Meteren, R. v., Someren, M. v.: Using content-based filtering for recommendation. In: Proceedings of ECML 2000 Workshop: Machine Learning in Information Age. pp. 47-56 (2000)
12. MITRE Corporation: Cve details. https://www.cvedetails.com/, (visited on: Jan. 30, 2019)
13. Netflix: Netflix prize. https://www.netflixprize.com/, (visited on: Feb. 7, 2019)
14. NIST: National vulnerability database. https://nvd.nist.gov/, (visited on: Jan. 30, 2019)
15. Polatidis, Nikolaos, E. P. M. P., Mouratidis, H.: Recommender systems meeting security: From product recommendation to cyber-attack prediction. In: In International Conference on Engineering Applications of Neural Networks. Springer, Cham. pp. 508-519 (2017)
16. Rapid7: Vulnerability and exploit database. https://www.rapid7.com/db, (visited on: Jan. 30, 2019)
17. Rosaci, Domenico, G. M. S., Garruzzo, S.: Muaddib: A distributed recommender system supporting device adaptivity. ACM Transactions on Information Systems (TOIS) 27(4) (2009)
18. Schafer, J. B., Konstan, J. A., Riedl, J.: E-commerce recommendation applications. Data Mining and Knowledge Discovery 5(1), 115-153 (2001)
19. Smyth, B.: Case-Based Recommendation, pp. 342-376. Springer Berlin Heidelberg, Berlin, Heidelberg (2007)
20. Synopsis Center for Open Source Research & Innovation: 2018 Black Duck by Synopsys Open Source Security and Risk Analysis (2018), https://www. blackducksoftware.com/open-source-security-risk-analysis-2018, Last accessed: Nov. 8, 2018
21. Yao, Y. Y.: Measuring retrieval effectiveness based on user preference of documents. Journal of the American Society for Information Science 46(2) (1995)

The invention claimed is:

1. A method for prioritizing among a plurality of vulnerabilities in a software code for a user by using a server, said method comprising
receiving a request, a software identification associated to the software code, and a user identification associated to the software code, and a user identification associated to the user from a user computer,
fetching feature data associated with the plurality of vulnerabilities from a vulnerability database, the fetched feature data comprising one or more features and corresponding feature values for each of the plurality of vulnerabilities;
fetching domain specific knowledge (DSK) data from a DSK database by using the software identification, wherein the DSK database comprises non-user defined values related to the one or more features for each of the plurality of vulnerabilities, fetching user specific knowledge (USK) data from a USK database by using the user identification, wherein the USK data comprises, for each fetched feature, a user selected preference value and an estimated user preference value, wherein the user selected preference value for the fetched feature is based on explicit user preferences selected directly by the user, and the estimated user preference value for the fetched feature is estimated based on user preferences determined indirectly based on the user's interactions with the user computer and/or the server, determining a utility estimation for each of the plurality of vulnerabilities, respectively, by comparing a feature value for each of the plurality of vulnerabilities with the DSK data and comparing the feature value for each of the plurality of vulnerabilities with the user selected preference value and estimated user preference value in the USK data, and transferring the utility estimations from the server to the user computer such that a prioritized list of vulnerabilities can be achieved, the prioritized list of vulnerabilities being ordered based on the utility estimations for the plurality of vulnerabilities.

2. The method according to claim 1, wherein the fetched features are selected from a group consisting of:
Confidentiality impact,
Integrity impact,
Availability impact,
Exploit accessibility,
Access vector,
Required privileges,
Impact metrics,
Exploitability subscore,
Privileges required,
Common Weakness Enumeration (CWE),
Published date,
Metasploit exploits,
Linked external resources, and
Web search engine hits.

3. The method according to claim 1, wherein user interaction data linking the user identification to one or several features in the fetched feature data are continuously collected and stored together with time stamps in a user profile database, and further comprising:
monitoring the user's interaction with one or more of the plurality of vulnerabilities and corresponding features;
determining a second estimated user preference value for a selected feature of the one or more of the plurality of vulnerabilities based on the monitoring, the second estimated user preference value being different from a prior first estimated user preference value for the selected feature; and
based on the estimated user preference value, updating the estimated user preference value in the USK data related to the selected feature, wherein the updating comprises merging the prior first estimated user preference value for a given vulnerability with the second estimated user preference value for the one or more of the plurality of vulnerabilities to determine a new estimated user preference value for the one or more of the plurality of vulnerabilities.

4. The method according to claim 1, wherein the step of determining the utility estimations for the vulnerabilities, respectively, by comparing the vulnerabilities with the DSK data and comparing the vulnerabilities with the USK data, is preceded by
determining DSK weights for the DSK data and a corresponding USK weight for each of the user selected and estimated preference values in the USK data, wherein the DSK weights are taken into account when comparing the vulnerabilities with the DSK data, and the USK weights are taken into account when comparing the vulnerabilities with the USK data.

5. The method according to claim 3, wherein the user selected preference value and estimated user preference value each comprise elements of USK vectors, wherein in the determining the elements of USK vectors corresponding to the user selected preference value for a selected feature of a selected vulnerability is compared with a feature value in the fetched feature data for the selected vulnerability to determine a first value for the selected vulnerability, wherein in the determining the elements of USK vectors corresponding to the estimated user preference value for the selected feature of the selected vulnerability is compared with the feature value in the fetched feature data for the selected vulnerability to determine a second value for the selected vulnerability, wherein in the determining the DSK data comprise elements of DSK vectors, wherein the elements of DSK vectors are compared with the feature value in the fetched feature data for the selected vulnerability to determine a third value for the selected vulnerability, wherein a separate weight is applied to each of the first, second, and third values to yield first, second, and third weighted values, respectively, and wherein the utility estimation for the selected vulnerability is based on the first, second, and third weighted values.

6. The method according to claim 5, wherein the DSK data is common to each user in a plurality of users and wherein the comparing is done by a similarity function.

7. The method according to claim 6, wherein the step of determining the utility estimations for the plurality of vulnerabilities, respectively, is performed by using a utility function based on similarity functions.

8. A server configured to prioritize among a plurality of vulnerabilities in a software code for a user such that a prioritized list of vulnerabilities can be provided, said server comprising a transceiver, a control unit and a memory,
wherein the transceiver is configured to:
receive a request, a software identification associated to the software code, and a user identification associated to the software code, and a user identification associated to the user from a user computer,
fetch feature data associated with the plurality of vulnerabilities from a vulnerability database, the fetched feature data comprising one or more features and corresponding feature values for each of the plurality of vulnerabilities;
fetch domain specific knowledge (DSK) data from a DSK database by using the software identification, wherein the DSK database comprises non-user defined values related to the one or more features for each of the plurality of vulnerabilities,
fetch user specific knowledge (USK) data from a USK database by using the user identification, wherein the USK data comprises, for each fetched feature, a user selected preference value and an estimated user preference value, wherein the user selected preference value for the fetched feature is based on explicit user preferences selected directly by the user, and the estimated user preference value for the fetched feature is estimated based on user preferences determined indirectly based on the user's interactions with the user computer and/or the server, determine a utility estimation for each of the plurality of vulnerabilities, respectively, by comparing a feature value for each of the plurality of vulnerabilities with the DSK data and comparing the feature value for each of the plurality of vulnerabilities with the user selected preference value and estimated user preference value in the USK data, and transfer the utility estimations from the server to the user computer such that a prioritized list of vulnerabilities can be achieved, the prioritized list of vulnerabilities being ordered based on the utility estimations for the plurality of vulnerabilities.

9. The server of claim 8, wherein the fetched features are selected from a group consisting of:
Confidentiality impact,
Integrity impact,
Availability impact,
Exploit accessibility,
Access vector,
Required privileges,
Impact metrics,
Exploitability subscore,
Privileges required,
Common Weakness Enumeration (CWE),
Published date,
Metasploit exploits,
Linked external resources, and
Web search engine hits.

10. The server according to claim 8, wherein the user interaction data linking the user identification to one or several features in the fetched feature data are continuously collected and stored together with time stamps in a user profile database, and wherein the transceiver is further configured to:
monitor the user's interaction with one or more of the plurality of vulnerabilities and corresponding features;
determine a second estimated user preference value for a selected feature of the one or more of the plurality of vulnerabilities based on the monitoring, the second estimated user preference value being different from a prior first estimated user preference value for the selected feature; and
based on the estimated user preference value, update the estimated user preference value in the USK data related to the selected feature, wherein the updating comprises merging the prior first estimated user preference value for a given vulnerability with the second estimated user preference value for the one or more of the plurality of vulnerabilities to determine a new estimated user preference value for the one or more of the plurality of vulnerabilities.

11. The server according to claim 8, wherein the determining of the utility estimations for the vulnerabilities, respectively, by comparing the vulnerabilities with the DSK data and comparing the vulnerabilities with the USK data, is preceded by the transceiver determining DSK weights for the DSK data and a corresponding USK weight for each of the user selected and estimated preference values in the USK data, wherein the DSK weights are taken into account when comparing the vulnerabilities with the DSK data, and the USK weights are taken into account when comparing the vulnerabilities with the USK data.

12. The server according to claim 10, wherein the user selected preference value and estimated user preference value each comprise elements of USK vectors, wherein in the determining the elements of USK vectors corresponding to the user selected preference value for a selected feature of a selected vulnerability is compared with a feature value in the fetched feature data for the selected vulnerability to determine a first value for the selected vulnerability, wherein in the determining the elements of USK vectors corresponding to the estimated user preference value for the selected feature of the selected vulnerability is compared with the feature value in the fetched feature data for the selected vulnerability to determine a second value for the selected vulnerability, wherein in the determining the DSK data comprise elements of DSK vectors, wherein the elements of DSK vectors are compared with the feature value in the fetched feature data for the selected vulnerability to determine a third value for the selected vulnerability, wherein a separate weight is applied to each of the first, second, and third values to yield first, second, and third weighted values, respectively, and wherein the utility estimation for the selected vulnerability is based on the first, second, and third weighted values.

13. The server according to claim 12, wherein the DSK data is common to each user in a plurality of users, wherein the comparing is done by a similarity function.

14. The server according to claim 13, wherein the step of determining the utility estimations for the plurality of vulnerabilities, respectively, is performed by using a utility function based on similarity functions.

15. A non-transitory computer-readable storage medium comprising an executable program stored thereon, wherein the program instructs a microprocessor to perform the following:
receiving a request, a software identification associated to software code, and a user identification associated to the software code, and a user identification associated to a user from a user computer,
fetching feature data associated with a plurality of vulnerabilities from a vulnerability database, the fetched feature data comprising one or more features and corresponding feature values for each of the plurality of vulnerabilities;
fetching domain specific knowledge (DSK) data from a DSK database by using the software identification, wherein the DSK database comprises non-user defined values related to the one or more features for each of the plurality of vulnerabilities,
fetching user specific knowledge (USK) data from a USK database by using the user identification, wherein the USK data comprises, for each fetched feature, a user selected preference value and an estimated user preference value, wherein the user selected preference value for the fetched feature is based on explicit user preferences selected directly by the user, and the estimated user preference value for the fetched feature is estimated based on user preferences determined indirectly based on the user's interactions with the user computer and/or a server,
determining a utility estimation for each of the plurality of vulnerabilities, respectively, by comparing a feature value for each of the plurality of vulnerabilities with the DSK data and comparing the feature value for each of the plurality of vulnerabilities with the user selected preference value and estimated user preference value in the USK data, and
transferring the utility estimations from the server to the user computer such that a prioritized list of vulnerabilities can be achieved, the prioritized list of vulnerabilities being ordered based on the utility estimations for the plurality of vulnerabilities.

16. The computer-readable storage medium of claim 15, wherein the user selected preference value and estimated user preference value each comprise elements of USK vectors, wherein in the determining the elements of USK vectors corresponding to the user selected preference value for a selected feature of a selected vulnerability is compared with a feature value in the fetched feature data for the selected vulnerability to determine a first value for the selected vulnerability, wherein in the determining the elements of USK vectors corresponding to the estimated user preference value for the selected feature of the selected vulnerability is compared with the feature value in the fetched feature data for the selected vulnerability to determine a second value for the selected vulnerability, wherein in the determining the DSK data comprise elements of DSK vectors, wherein the elements of DSK vectors are compared with the feature value in the fetched feature data for the selected vulnerability to determine a third value for the selected vulnerability, wherein a separate weight is applied to each of the first, second, and third values to yield first, second, and third weighted values, respectively, and wherein the utility estimation for the selected vulnerability is based on the first, second, and third weighted values.

17. The computer-readable storage medium of claim 15, wherein user interaction data linking the user identification to one or several features in the fetched feature data are continuously collected and stored together with time stamps in a user profile database, and wherein the microprocessor further performs the following:

monitoring the user's interaction with one or more of the plurality of vulnerabilities and corresponding features;

determining a second estimated user preference value for a selected feature of the one or more of the plurality of vulnerabilities based on the monitoring, the second estimated user preference value being different from a prior first estimated user preference value for the selected feature; and based on the estimated user preference value, updating the estimated user preference value in the USK data related to the selected feature, wherein the updating comprises merging the prior first estimated user preference value for a given vulnerability with the second estimated user preference value for the one or more of the plurality of vulnerabilities to determine a new estimated user preference value for the one or more of the plurality of vulnerabilities.

18. The computer-readable storage medium of claim 15, wherein the step of determining the utility estimations for the vulnerabilities, respectively, by comparing the vulnerabilities with the DSK data and comparing the vulnerabilities with the USK data, is preceded by determining DSK weights for the DSK data and a corresponding USK weight for each of the user selected and estimated preference values in the USK data, wherein the DSK weights are taken into account when comparing the vulnerabilities with the DSK data, and the USK weights are taken into account when comparing the vulnerabilities with the USK data.

* * * * *